United States Patent
Han et al.

(10) Patent No.: US 11,086,663 B2
(45) Date of Patent: *Aug. 10, 2021

(54) PRELOADING APPLICATION USING ACTIVE WINDOW STACK

(71) Applicant: GUANGDONG OPPO MOBILE TELECOMMUNICATIONS CORP., LTD., Guangdong (CN)

(72) Inventors: Shiguang Han, Xuhui Shanghai (CN); Yan Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 216 days.

This patent is subject to a terminal disclaimer.

(21) Appl. No.: 16/397,521

(22) Filed: Apr. 29, 2019

(65) Prior Publication Data
US 2019/0347128 A1 Nov. 14, 2019

(30) Foreign Application Priority Data
May 10, 2018 (CN) .......................... 201810442588.4

(51) Int. Cl.
*G06F 9/48* (2006.01)
*G06F 9/445* (2018.01)
*G06F 9/50* (2006.01)

(52) U.S. Cl.
CPC ........ *G06F 9/4875* (2013.01); *G06F 9/44578* (2013.01); *G06F 9/5088* (2013.01)

(58) Field of Classification Search
CPC ............................... G06F 9/4875; G06F 9/445
See application file for complete search history.

(56) References Cited

U.S. PATENT DOCUMENTS

| | | | |
|---|---|---|---|
| 9,557,889 B2 | 1/2017 | Raleigh et al. | |
| 10,261,938 B1 | 4/2019 | Jenkins et al. | |
| 10,459,887 B1 | 10/2019 | Dvortsov et al. | |
| 2003/0220984 A1 | 11/2003 | Jones et al. | |
| 2005/0160352 A1 | 7/2005 | Chung et al. | |

(Continued)

FOREIGN PATENT DOCUMENTS

| | | |
|---|---|---|
| CN | 102541602 A | 7/2012 |
| CN | 103106000 A | 5/2013 |

(Continued)

OTHER PUBLICATIONS

Extended European search report issued in corresponding European application No. 19171253.8 dated Sep. 30, 2019.

(Continued)

*Primary Examiner* — Benjamin C Wu
(74) *Attorney, Agent, or Firm* — Young Basile Hanlon & MacFarlane, P.C.

(57) ABSTRACT

A method for preloading an application, a storage medium, and a terminal are provided. The method includes the following. An event of preloading an application is detected to be triggered. A target application to be preloaded is determined. An active window stack for preloading is created according to a predetermined rule, and an application interface of the target application is preloaded according to the active window stack for preloading, where the active window stack for preloading has boundary coordinates locating outside a coordinate range of a display screen.

16 Claims, 7 Drawing Sheets

(56) References Cited

U.S. PATENT DOCUMENTS

| | | |
|---|---|---|
| 2007/0016480 A1 | 1/2007 | Lee |
| 2008/0005736 A1 | 1/2008 | Apacible et al. |
| 2009/0144396 A1 | 6/2009 | Walton |
| 2011/0292060 A1 | 12/2011 | Chambers et al. |
| 2011/0295830 A1 | 12/2011 | Swahn |
| 2012/0167122 A1 | 6/2012 | Koskimies |
| 2013/0067394 A1 | 3/2013 | Nan et al. |
| 2013/0076597 A1 | 3/2013 | Becze |
| 2013/0120294 A1 | 5/2013 | Sun et al. |
| 2014/0075377 A1 | 3/2014 | Kang |
| 2014/0372356 A1 | 12/2014 | Bilal et al. |
| 2015/0355795 A1 | 12/2015 | Falkenburg et al. |
| 2016/0070421 A1 | 3/2016 | Zhang et al. |
| 2016/0189049 A1 | 6/2016 | Silvestri et al. |
| 2016/0203021 A1 | 7/2016 | Pike et al. |
| 2016/0360336 A1 | 12/2016 | Gross et al. |
| 2016/0364272 A1 | 12/2016 | Hou et al. |
| 2017/0330248 A1 | 11/2017 | Gomariz et al. |
| 2017/0344783 A1 | 11/2017 | Zhang et al. |
| 2018/0077243 A1 | 3/2018 | Mathew et al. |
| 2018/0246635 A1 | 8/2018 | Baer et al. |
| 2018/0293087 A1 | 10/2018 | Lee et al. |
| 2019/0018565 A1* | 1/2019 | Lee ................. G06F 3/04886 |
| 2019/0065240 A1* | 2/2019 | Kong ................. G06F 9/451 |
| 2019/0146625 A1 | 5/2019 | Zhu |
| 2019/0258372 A1 | 8/2019 | Wang |
| 2019/0361581 A1* | 11/2019 | Wang ................. G06F 3/0484 |
| 2020/0401418 A1* | 12/2020 | Regev ................. G06F 9/547 |

FOREIGN PATENT DOCUMENTS

| | | | |
|---|---|---|---|
| CN | 103376974 A | 10/2013 | |
| CN | 103581754 A | 2/2014 | |
| CN | 104298554 A | 1/2015 | |
| CN | 104657183 A | 5/2015 | |
| CN | 105426214 A | 3/2016 | |
| CN | 105657522 A | 6/2016 | |
| CN | 10591227 A | 8/2016 | |
| CN | 105939416 A | 9/2016 | |
| CN | 105955765 A | 9/2016 | |
| CN | 106056010 A | 10/2016 | |
| CN | 106201241 A | 12/2016 | |
| CN | 106201448 A | 12/2016 | |
| CN | 106325913 A | 1/2017 | |
| CN | 106648733 A | 5/2017 | |
| CN | 106685851 A | 5/2017 | |
| CN | 106919313 A | 7/2017 | |
| CN | 106941672 A | 7/2017 | |
| CN | 106959879 A | 7/2017 | |
| CN | 107229397 A | 10/2017 | |
| CN | 107508961 A | 12/2017 | |
| CN | 107748686 A | 3/2018 | |
| CN | 107783801 A | 3/2018 | |
| CN | 108572965 A | 9/2018 | |
| CN | 108595224 A | 9/2018 | |
| CN | 108762843 A | 11/2018 | |
| WO | 2017057912 A1 | 4/2017 | |
| WO | 2018055506 A1 | 3/2018 | |
| WO | WO-2018055506 A1 * | 3/2018 | ............... G06F 9/46 |
| WO | 2018161812 A1 | 9/2018 | |
| WO | 2019171237 A1 | 9/2019 | |

OTHER PUBLICATIONS

English Translation Office Action 1 issued in corresponding Chinese application No. 201810442588.4 dated Mar. 29, 2019.

English Translation Office Action 2 issued in corresponding Chinese application No. 201810442588.4 dated Oct. 15, 2019.

English Translation Office Action 3 issued in corresponding Chinese application No. 201810442588.4 dated May 18, 2020.

Third-party submission issued in corresponding U.S. Appl. No. 16/290,190 dated Jun. 5, 2020.

Android Developer Guide—Handle activity State Changes (Dated May 8, 2018 and retrieved from www. archive. org on May 27, 2020).

Android Developer Guide—Understand the Activity Lifecycle (Dated May 8, 2018 and retrieved from www. archive. org on May 27, 2020).

International search report issued in corresponding international application No. PCT/CN2019/083256 dated Jun. 14, 2019.

Extended European search report issued in corresponding European application No. 19168847.2 dated Oct. 23, 2019.

Ricardo Baeza-Yates et al: "Predicting the Next App That You Are Going to Use", Web Search and Data Mining, ACM, 2 Pennplaza, Suite 701 New York NY 10121-0701,USA; dated Feb. 2, 2015; pp. 285-294, XP058065486.

International search report issued in corresponding international application No. PCT/CN2019/085900 dated Aug. 1, 2019.

Examination report issued in corresponding IN application No. 20191401964 dated Nov. 27, 2020.

Examination report issued in corresponding IN application No. 201914017025 dated Jan. 27, 2021.

Extended European search report issued in corresponding European application No. 19793314.6 dated Apr. 20, 2021.

Notice of allowance issued in corresponding U.S. Appl. No. 16/394,768 dated Apr. 28, 2021.

First examination report issued in corresponding IN application No. 201914018342 dated May 12, 2021.

Fourth examination report with English Translation issued in corresponding CN application No. 201711340000.6 dated Jun. 3, 2021.

* cited by examiner

PRELOADING APPLICATION USING ACTIVE WINDOW STACK

CROSS-REFERENCE TO RELATED APPLICATION(S)

The present disclosure claims priority to Chinese Patent Application No. 201810442588.4, filed on May 10, 2018, the entire disclosure of which is hereby incorporated by reference.

TECHNICAL FIELD

The present disclosure relates to the technical field of preloading an application, and particularly to a method for preloading an application, a storage medium, and a terminal.

BACKGROUND

At present, terminals such as smart phones, tablet computers, notebook computers, and smart home appliances have become indispensable electronic devices in people's daily life. With the development of intelligence of terminal devices, most of the terminal devices are loaded with an operating system, such that a variety of applications can be installed in the terminal devices to satisfy different user requirements.

With the improvement of configuration of the terminal devices, dozens or even hundreds of applications can be installed in most of the terminal devices. As functions of the applications become more and more abundant, resources required for running the applications are also increased. When an application is selected to be launched in response to user selection, the terminal loads resources required for running the application, and after preloading, an initial interface of the application is displayed. The whole process usually takes several seconds or even ten seconds, and thus launching of the application is inefficient and needs to be improved.

SUMMARY

Implementations of the present disclosure provide a method for preloading an application, a storage medium, and a terminal, which can optimize a solution for loading an application.

In a first aspect, the implementations of the present disclosure provide a method for preloading an application. The method includes the following.

A target application to be preloaded is determined in response to triggering an event of preloading an application. An active window stack for preloading is created according to a predetermined rule, and an application interface of the target application is preloaded according to the active window stack for preloading, where the active window stack for preloading has boundary coordinates locating outside a coordinate range of a display screen.

In a second aspect, the implementations of the present disclosure provide a computer readable storage medium. The computer readable storage medium stores computer programs which, when executed by a processor, are operable with the processor to execute the method for preloading an application provided in the implementations of the present disclosure.

In a third aspect, the implementations of the present disclosure provide a terminal. The terminal includes a memory, a processor, and computer programs stored in the memory and operable with the processor. The processor is configured to execute the computer programs to perform the method for preloading an application provided in the implementations of the present disclosure.

DETAILED DESCRIPTION

Technical solutions of the present disclosure will be further described below through implementations with reference to the accompanying drawings. It will be appreciated that the implementations are described herein for the purpose of explaining the disclosure rather than limiting the disclosure. In addition, it should also be noted that, for the convenience of description, only some rather than all structures related to the present disclosure are illustrated in the accompanying drawings.

Before discussing the exemplary implementations in more detail, it should be mentioned that some implementations are described as processes or methods illustrated by a flowchart. In the flowchart, although steps are depicted as being processed sequentially, some of the steps may be performed in parallel, concurrently, or simultaneously. In addition, the order of the steps can be rearranged. The process of one step may be terminated when a corresponding operation is completed, but the implementations may also have additional steps that are not illustrated in the drawings. The process may correspond to a method, a function, a procedure, a subroutine, a subprogram, and the like.

According to an implementation of the present disclosure, a method for preloading an application is provided. The method includes the following. A target application to be preloaded is determined in response to triggering an event of preloading an application. An active window stack for preloading is created according to a predetermined rule, and an application interface of the target application is preloaded according to the active window stack for preloading, where the active window stack for preloading has boundary coordinates locating outside a coordinate range of a display screen.

In the implementation, preloading the application interface of the target application includes the following. A target process for the target application is created. A task stack for the target application is created in the active window stack for preloading. An active window for the target application is launched in the task stack according to the target process. The application interface of the target application is drawn and displayed according to the active window launched.

In the implementation, the method further includes the following. The target application is enabled to have a focus independent of a focus of an application in the foreground, and the application interface of the target application is drawn and updated during a preset period according to the focus of the target application.

In the implementation, duration of the preset period comprises play duration of preset content of the target application, and during play of the preset content of the target application, the target application is unable to respond to user input.

In the implementation, the method further includes the following. In response to receiving an instruction for running the target application, the application interface of the target application is migrated to the display screen for display.

In the implementation, migrating the application interface of the target application to the display screen for display includes the following. A task stack for the target application is migrated to a top of an application active window stack, where the task stack is contained in the active window stack for preloading, and the application active window stack has boundary coordinates locating within the coordinate range of the display screen. Size information, configuration information, and visibility of the task stack are updated to display the application interface of the target application on the display screen.

In the implementation, the boundary coordinates of the active window stack for preloading are denoted as (H, 0, 2H, H), the boundary coordinates correspond to a system coordinate system, the system coordinate system has an origin locating at an upper left corner of the display screen, and H denotes a length of a long side of a display area of the display screen.

According to another implementation of the present disclosure, a terminal is provided. The terminal includes at least one processor and a computer readable memory, coupled to the at least one processor and storing at least one computer executable instruction therein, which when executed by the at least one processor, cause the at least one processor to carry out following actions. A target application to be preloaded is determined in response to triggering an event of preloading an application. An active window stack for preloading is created according to a predetermined rule, and an application interface of the target application is preloaded according to the active window stack for preloading, where the active window stack for preloading has boundary coordinates locating outside a coordinate range of a display screen.

According to yet another implementation of the present disclosure, a non-transitory computer-readable storage medium is provided. The storage medium stores at least one computer-executable instruction which, when executed by at least one processor, causes the at least one processor to carry out following actions. A target application to be preloaded is determined in response to triggering an event of preloading an application. An active window stack for preloading is created according to a predetermined rule, and an application interface of the target application is preloaded according to the active window stack for preloading, where the active window stack for preloading having boundary coordinates locating outside a coordinate range of a display screen.

Figure 1:
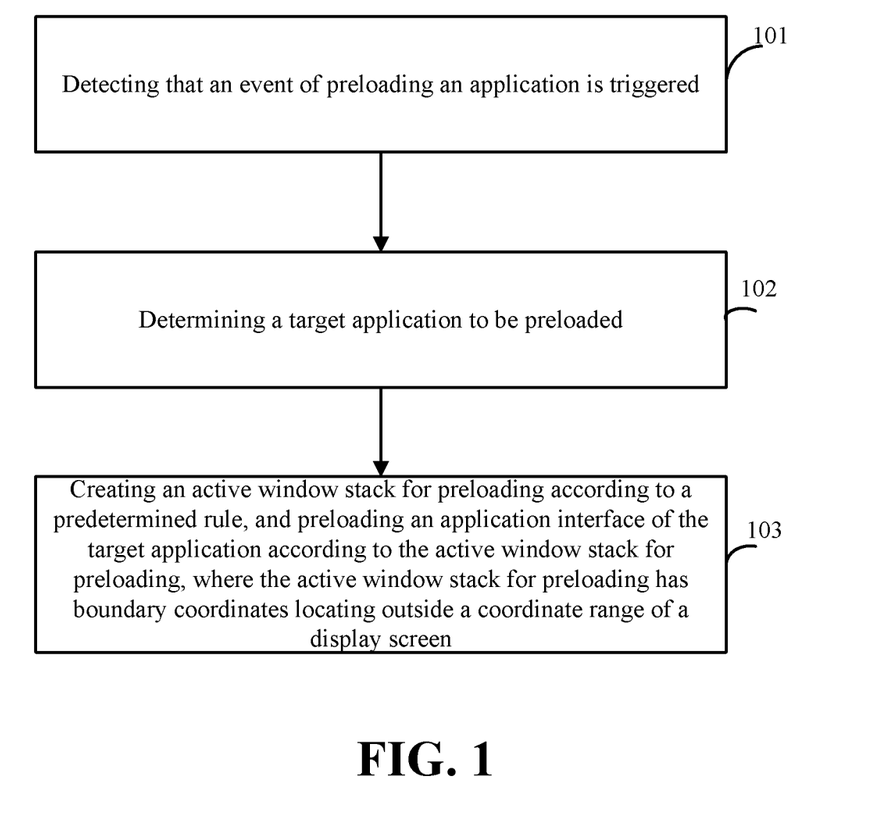
FIG. 1 is a flow chart illustrating a method for preloading an application according to an implementation of the present disclosure.

FIG. 1 is a flow chart illustrating a method for preloading an application according to an implementation of the present disclosure. The method can be implemented by a terminal such as a phone, a tablet computer, a notebook computer, a smart home appliance or the like. As illustrated in FIG. 1, the method begins at block 101.

At block 101, an event of preloading an application is detected to be triggered.

In the implementation, a condition for triggering the event of preloading an application may be set according to practical situations, which is not limited herein. For example, the event of preloading an application may be triggered in response to detecting that a user motion (such as taking up the terminal, an input operation for unlocking the screen or the terminal, and the like) satisfies a preset condition. For another example, the event of preloading an application may be triggered in response to detecting a switch of a foreground application. For another example, the event of preloading an application may be triggered immediately (or after a preset duration) after finishing a predicting process of the application preloading. For another example, the event of preloading an application may be triggered periodically. After the event of preloading an application is triggered, an operating system may detect that the event of preloading an application has been triggered, by ways of reading a flag, receiving a trigger instruction, or the like. The ways of detection are not limited in the implementations of the present disclosure.

At block 102, a target application to be preloaded is determined.

In the implementation, the application to be preloaded may be understood as an application that may be opened soon, and may be a fixed application preset, an application predicted in a certain way, or the like. One or more applications to be preloaded may be included. The target application may be understood as an application to be preloaded and needed to be preloaded at current time. One or more target applications may be included. When only one application to be preloaded is included, accordingly, only one target application is included. When multiple applications to be preloaded are included, one target application may be included, that is, each of the multiple applications to be preloaded is determined as the target application and preloaded in sequence; or more target applications may be included, that is, two or more applications to be preloaded are determined as the target applications and simultaneously preloaded, i.e., it means that preloading multiple target applications can be performed concurrently.

In an implementation, the application to be preloaded may be predicted using a prediction model. The prediction model may be a machine learning model, and an algorithm used may include a recurrent neural network (RNN), a long short-term memory (LSTM) network, a gated recurrent unit, a simple recurrent unit, an auto encoder, a decision tree, a random forest, feature mean classification, a classification and regression tree, a hidden Markov model, a K-nearest neighbor (KNN) algorithm, a logistic regression model, a Bayesian model, a Gaussian model, a Kullback-Leibler (KL) divergence, and the like.

In an implementation, training samples may be collected during usage of the terminal, and a preset initial model may be trained using the training samples to finally obtain the prediction model for predicting the application to be preloaded. For example, elements contained in the training samples may include a time sequence of opening applications or an order of opening the applications, and may include time of opening each of the applications, a location where each of the applications is opened, and the number of times each of the applications is opened. The elements may include running status of the terminal, such as on/off status of a mobile data network, a wireless hotspot connection status, identity information of a connected wireless hotspot, an application currently running, a previous foreground application, duration of that a current application stays in the background, time of last switch of the current application to the background, plugging and unplugging status of an earphone jack, a charging state, power information of a battery, display duration of a screen, and the like; may also include data collected by sensors integrated in the terminal, such as a motion sensor, a light sensor, a temperature sensor, a humidity sensor, and the like.

For example, proper sample elements may be selected according to the machine learning model adopted. The machine learning model also may be selected according to the sample elements selected. Furthermore, the machine learning model and sample elements may be selected according to requirements for prediction accuracy and preset speed and the like. The present disclosure is not limited thereto.

In the implementation of the present disclosure, the target application to be preloaded may be determined as follows. The target application to be preloaded is determined according to a previous output result of the prediction model, and may also be predicted using the prediction model, and the target application to be preloaded is determined according to a current output result of the prediction model.

At block 103, an active window stack for preloading is created according to a predetermined rule, and an application interface of the target application is preloaded according to the active window stack for preloading, where the active window stack for preloading has boundary coordinates locating outside a coordinate range of a display screen.

In the implementation of the present disclosure, an active window can be understood as a separate interface that is directly responsible for interaction with the user and operations of the user. The interface can be named with different nouns in different operating systems. For convenience of understanding, in the following Android® operating system is taken as an example for illustration.

In the Android system, the active window is named as "Activity". The Activity is a component responsible for interaction with the user. The Activity provides a screen (which can be understood as a screen interface rather than a physical display screen) for interaction with the user to complete a task. In an Android application, one Activity is usually a separate screen that can display some widgets and can also monitor and handle user events. For management of one Activity, two concepts "Task" (task stack) and "Stack" (active window stack) are included. One Task corresponds to an application and is configured to store at least one Activity. One or more Activities can be stored in one Task and the Activities follow a principle of "first in, last out; last in, first out". One Stack is configured to manage at least one Task. Usually, one Stack manages each Task including at least one Activity to be displayed on one screen. One Stack can manage one or more Tasks. Certainly, each Stack also follows a basic management principle followed by the stack. The screen described herein is not necessarily a completely separate display screen. Taking "two screens" as an example, the two screens may be just two regions in a complete display screen, and independently display contents. Certainly, the "two screens" may also be two separate display screens when the terminal has two or even more than two separate display screens.

In the Android system, a multi-window mode is supported, and the multi-window mode may include a split-screen mode, a picture-in-picture mode, and a free mode (FreeForm). In the multi-window mode, each Stack corresponding to one application may have its own size, and may include a top coordinate, a bottom coordinate, a left coordinate, and a right coordinate in a coordinate system, where in the coordinate system, a top left corner of the screen of the terminal is taken as an origin. For example, boundaries of a rectangle are generally described by (a, b, c, d) and may be represented by coordinates of a top left corner and coordinates of a bottom right corner of the rectangle. That is, the coordinates of the top left corner of the rectangle are (a, b) and the coordinates of the bottom right corner of the rectangle are (c, d). Such a rectangular region has a size corresponding to the size of the Stack. An application layout in the Stack is based on the size of the Stack. That is, an application interface corresponding to one Activity is displayed within the bounds of the stack.

In the multi-window mode, multiple applications may be allowed to be visible (to be visible to both the system and the user or to be visible to the system only). When an application is visible to both the system and the user, it means that the application is displayed on the display screen and is visible to the user. When an application is visible to the system only, it means that the application is only visible to the operating system and is invisible to the user, and the application may be obscured by the foreground application, or displayed outside the display screen as implemented in the present disclosure.

In the implementation of the present disclosure, the application interface of the target application can be preloaded outside the display screen according to a multi-window mechanism of the operating system. With the multi-window mechanism, the boundary coordinates of the active window stack for preloading are set to locate outside the display screen to achieve the purpose of being invisible to the user, and therefore display of display content of the foreground application on the display screen cannot be affected.

In the multi-window mode, multiple types of Stacks may be included. For example, a Home Stack represents a stack for display of a desktop application, and an App Stack represents a stack for display of a third-party application. Other split-screen stacks may also be included. Content contained in the above three types of Stacks may be displayed on the display screen, and the three types of Stacks are collectively referred to as application active window stacks in the implementation of the present disclosure. In the implementation of the present disclosure, the active window stack for preloading is added to represent a stack for display of an application preloaded, and boundary coordinates of the active window stack for preloading are set to locate outside the coordinate range of the display screen. The application to be preloaded can be displayed on a display area provided according to the active window stack for preloading. For the Android system, a new stack specially for displaying applications preloaded can be created according to the multi-window mechanism of the Android system. In the implementation of the present disclosure, the new stack is created to enable the new active window stack for preloading to have its own size and visibility, thereby achieving the purpose of finishing preloading outside the display screen.

In the implementation of the present disclosure, a time for creating the active window stack for preloading is not limited. The active window stack for preloading may be set to be resident by default before the terminal is shipped, that is, the active window stack for preloading always exists. The active window stack for preloading may also be created after the terminal is turned on or unlocked. Further, the active window stack for preloading may be created after the event of preloading an application is triggered (before the target application is determined). In an implementation, according to the active window stack for preloading, the application interface of the target application is preloaded as follows. Whether the active window stack for preloading exists is determined. When the active window stack for preloading is absent, the active window stack for preloading is created. The application interface of the target application is preloaded according to the active window stack for preloading. In this way, whether the active window stack for preloading exists is determined after the target application to be preloaded is determined; if the active window stack for preloading exists, no new stack is required to be created, and if the active window stack for preloading is absent, the active window stack for preloading is created, so that system resources can be saved. It can be understood that when multiple target applications are included, that is, when multiple target applications need to be preloaded continuously in a short period, since the active window stack for preloading is created before the first target application starts to be loaded, the active window stack for preloading still exists before the second target application starts to be preloaded, and it is not necessary to perform the above determination.

In the implementation of the present disclosure, a specific process for preloading the application interface of the target application according to the active window stack for preloading is not limited. For example, the application interface may be drawn and displayed according to the size of the active window stack for preloading.

According to the method for preloading an application provided in the implementation of the present disclosure, after detecting that the event of preloading an application is triggered, the target application to be preloaded is determined, the active window for preloading is created according to the predetermined rule, and the application interface of the target application is preloaded according to the active window stack for preloading, where the boundary coordinates of the active window stack for preloading locate outside the coordinate range of the display screen. By using the technical scheme described above, an application interface of an application that needs to be preloaded can be preloaded according to the active window stack for preloading, where the active window stack for preloading locates outside the display screen. In this way, preparations prior to launching of the application can be completed to a large extent and a speed of launching the target application can be increased, without affecting display of display content of the foreground application on the display screen.

In some implementations, according to the active window stack for preloading, the application interface of the target application is preloaded as follows. A target process for the target application is created. A task stack for the target application is created in the active window stack for preloading. An active window for the target application is launched in the task stack according to the target process. The application interface of the target application is drawn and displayed according to the active window launched. In this way, it is possible to draw and display the application interface of the target application according to the active window stack for preloading, where the active window stack for preloading has boundary coordinates locating outside the coordinate range of the display screen, and thus running and display of the foreground application is not interfered, system stability is ensured, and the speed of launching the target application is increased. While the target process is created, a procedure of initiating the target process may be included. During execution of the foregoing operations, preloading of other resources may be also involved, such as application service launching, memory allocation, file content reading, network data acquisition, and the like. Procedures of preloading the other resources are not limited in the implementations of the present disclosure.

In some implementations, the method further includes the following. A notification of a forged focus is sent to the target application, and according to the notification of the forged focus, the application interface of the target application are drawn and updated continuously during a preset period. In this way, it is possible to finish drawing and display of the application interface under a condition that the target application obtains a focus and is visible to the system, thereby improving completeness of preloading without interfering with the focus of the foreground application. The focus described in the implementations of the present disclosure is also referred to as an input focus. The forged focus is independent of the focus of the foreground application. Generally, for the current Android system, the focus is unique, and an input operation such as touching is only effective for the focus. For the system and the application, input focus information is consistent. Once the system modifies the input focus information, a message for notifying that the input focus information is changed is sent to the application, such that for the system and the application the input focus information is consistent. In the implementations of the disclosure, by separating input focus information of the system and input focus information of the application, the purpose of forging a focus by the application can be achieved. In the implementations of the present disclosure, for the application preloaded, the notification of the forged focus enables the application preloaded has focus information, while the focus information of the system is still correct. In this way, the application preloaded can be drawn normally to realize fully loading. Both the system and the application have the focus, and it can be regarded as that both a server and a client have a focus. The system records the application with the focus, and the application has a flag for identifying whether the application has the focus. When a window system of the Android system adds a new window and needs to update the focus, it is time to forge the input focus, and the notification of the forged focus is generated and sent. The focus may be forged in a way of calling the client of the window to change the focus of the window, so that the window obtains the focus. In an implementation, a Binder mechanism can be used to transmit the notification of the forged focus. The Binder mechanism is a method most commonly used for inter-process communication in the Android system, and adopts a c/s architecture, that is, the client/service architecture.

In the implementation of the present disclosure, the preset period may be set according to practical situations. For example, the preset period may be a fixed period after starting the preloading, a period from start of the preloading to completion of the preloading, or the like. In some implementations, the preset period may be play duration of a launched advertisement or a launched animation of the target application. During launching, some applications may play some advertisements or animations which may last for three or ten or more seconds. No user operation can be performed during playing of the advertisements or animations besides waiting for completion of the playing, thereby wasting user time. According to the implementation of the present disclosure, it is possible to complete the playing of the advertisements or animations outside the screen before launching the target application, and thus when the target application is launched, a homepage or other pages of the application operable for the user can be directly displayed. In this way, a time point at which the target application is operable can be further advanced, thereby reducing waiting time.

In some implementations, the method further includes the following after the application interface of the target application is preloaded according to the active window stack for preloading. In response to receiving an instruction for running the target application, the application interface of the target application is migrated to the display screen for display. In this way, when the target application needs to be launched, it is possible to directly migrate the application interface drawn to the display screen for display, thereby realizing fast switch of application interfaces and increasing the speed of launching the target application.

In some implementations, the application interface of the target application is migrated to the display screen for display as follows. A task stack for the target application is migrated to a top of an application active window stack, where the task stack is contained in the active window stack for preloading, and boundary coordinates of the application active window stack locates outside of the coordinate range of the display screen. Size information, configuration information, and visibility of the task stack are updated, such that the application interface of the target application can be displayed on the display screen. In this way, it is possible to ensure stability of a process of migrating the interface and avoid problems of lag, black screen, low migration speed, or the like during recovery.

Figure 2:
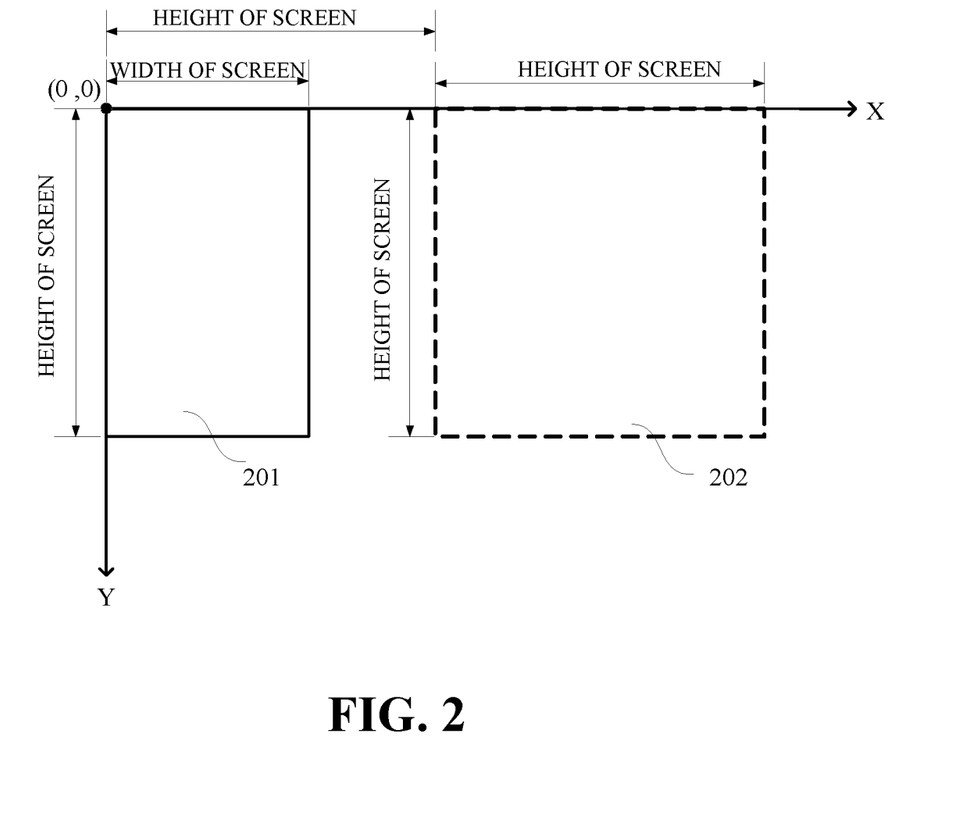
FIG. 2 is a schematic diagram illustrating a relative positional relationship between an active window stack for preloading and a display area of a display screen according to an implementation of the present disclosure.
Figure 3:
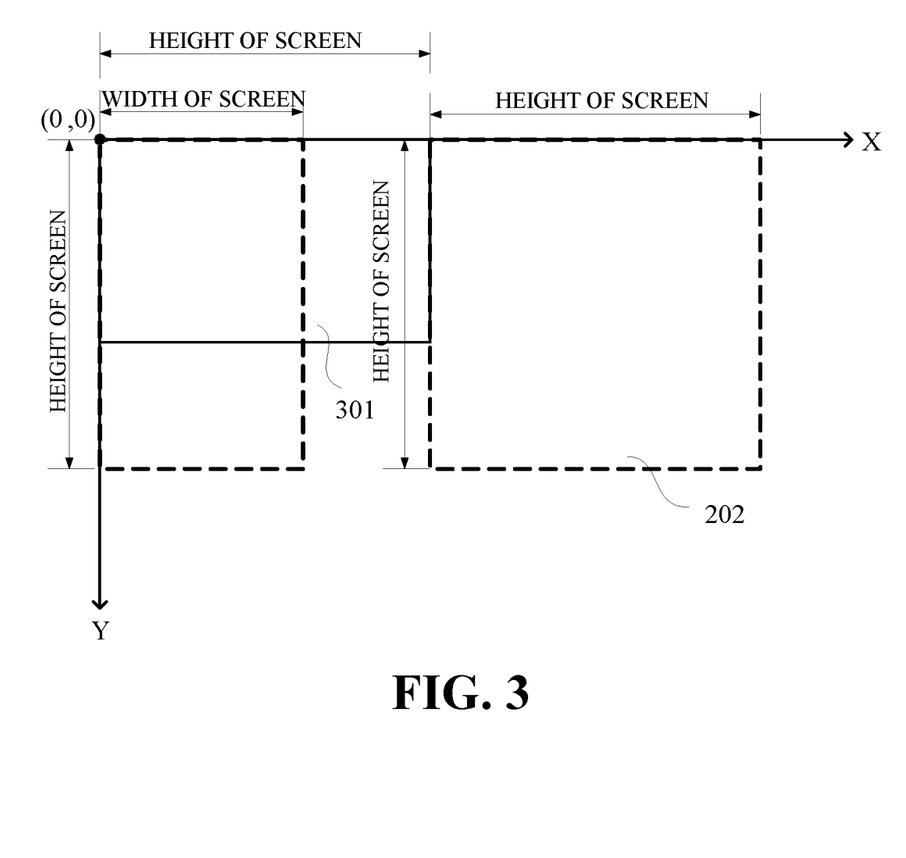
FIG. 3 is a schematic diagram illustrating a relative positional relationship between an active window stack for preloading and a display area of a display screen according to another implementation of the present disclosure.

For some terminals, particularly for mobile terminals such as mobile phones and tablet computers, for easy usage, display modes of the display screen generally include a landscape mode and a portrait mode. Many applications are displayed in the portrait mode by default, while some applications are displayed in the landscape mode by default (such as some online games). During usage of the terminal, some applications may be switched between the landscape mode and the portrait mode following a change of a direction of holding the terminal. In some implementations of the present disclosure, the boundary coordinates of the active window stack for preloading are denoted as (H, 0, 2H, H), the boundary coordinates correspond to a system coordinate system, where the system coordinate system has an origin locating at an upper left corner of the display screen, and H denotes a length of a long side of a display area of the display screen. That is, a side having the length H is the longest side of the display area of the display screen, and H is the height of the display screen in the portrait mode or the width of the display screen in the landscape mode. In this way, it is possible to take the landscape mode of the display screen, display of the application preloaded in the landscape mode, and normal display of some applications into considerations. FIG. 2 is a schematic diagram illustrating a relative positional relationship between an active window stack for preloading and a display area of a display screen according to an implementation of the present disclosure. As illustrated in FIG. 2, a display screen 201 is in the portrait mode. An origin of a system coordinate system of the terminal locates at a left vertex (0, 0) of the display screen 201. A width direction of the display screen 201 is defined as an X-axis, and a height direction is defined as a Y-axis. Boundary coordinates of a stack 202 for preloading are denoted as (H, 0, 2H, H), where H denotes a height of the screen. That is, a region within a solid rectangle on the left side is a display area of the display screen, and a region within a dotted rectangle on the right side is a region for displaying the application preloaded. FIG. 3 is a schematic diagram illustrating another relative positional relationship between an active window stack for preloading and a display area of a display screen according to an implementation of the present disclosure. As illustrated in FIG. 3, a display screen 301 is in the landscape mode. An origin of a system coordinate system of the terminal locates at a left vertex (0, 0) of the display screen 301. A height direction of the display screen 301 is defined as an X-axis, and the width direction is the defined as a Y-axis. The boundary coordinates of the stack 202 for preloading are denoted as (H, 0, 2H, H), where H denotes a height of the screen. That is, a region within a solid rectangle on the left side is a display area of the display screen, and a region within a dotted rectangle on the right side is a region for displaying the application preloaded.

Boundaries of the active window stack for preloading are set for reasons as follows.

A horizontal coordinate of an upper left corner is H, thereby preventing an interface of the application preloaded from being displayed on the display screen (also referred to as a main screen) when in the landscape mode. Since the main screen may be in the landscape mode in addition to the portrait mode, when the main screen is in the landscape mode, in order to prevent part of the application preloaded from being displayed on the display area of the main screen, the horizontal coordinate of the upper left corner of the rectangle region corresponding to the active window stack for preloading is set to be the height of the main screen.

A vertical coordinate of the upper left corner is 0, and thus the application preloaded can accurately calculate a height of a status bar. For better designing a user interface (UI), an Android application may customize a status bar at the top. If the vertical coordinate corresponding to an upper side is not equal to 0, the height of the status bar may be wrong.

A horizontal coordinate of a lower right corner is 2H (twice the height of the screen), that is, a width of a rectangle corresponding to the active window stack for preloading equals the height of the screen. In this way, the size of the active window stack for preloading can enable a landscape application preloaded (that is, an application with an application interface in the landscape mode) to be displayed.

A vertical coordinate of the lower right corner is H, that is, a height of the rectangle corresponding to the active window stack for preloading equals the height of the screen. In this way, the size of the active window stack for preloading can enable a portrait application preloaded to be displayed.

For the reasons above, the size of the active window stack for preloading is set to be defined by (H, 0, 2H, H).

Figure 4:
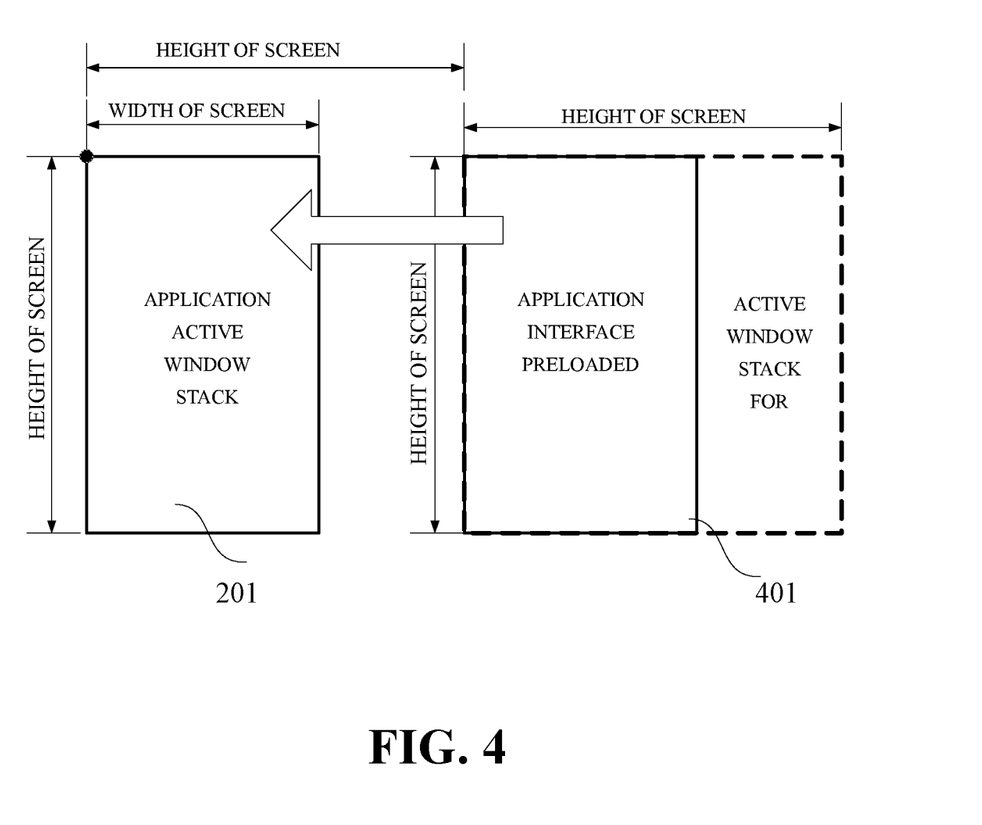
FIG. 4 is a schematic diagram illustrating migration of an application interface according to an implementation of the present disclosure.

In addition, FIG. 4 is a schematic diagram illustrating migration of an application interface according to an implementation of the present disclosure. As illustrated in FIG. 4, in response to receiving an instruction for running the target application, an application interface 401 of the target application is migrated to the display screen 201 for display, where the application interface is contained in the active window stack for preloading. In the implementation, the task corresponding to the interface of the application preloaded is migrated to the top of the application active window stack, and the size information, the configuration information, and the visibility of the task are updated. Therefore, the application interface can be displayed on the display screen normally.

Figure 5:
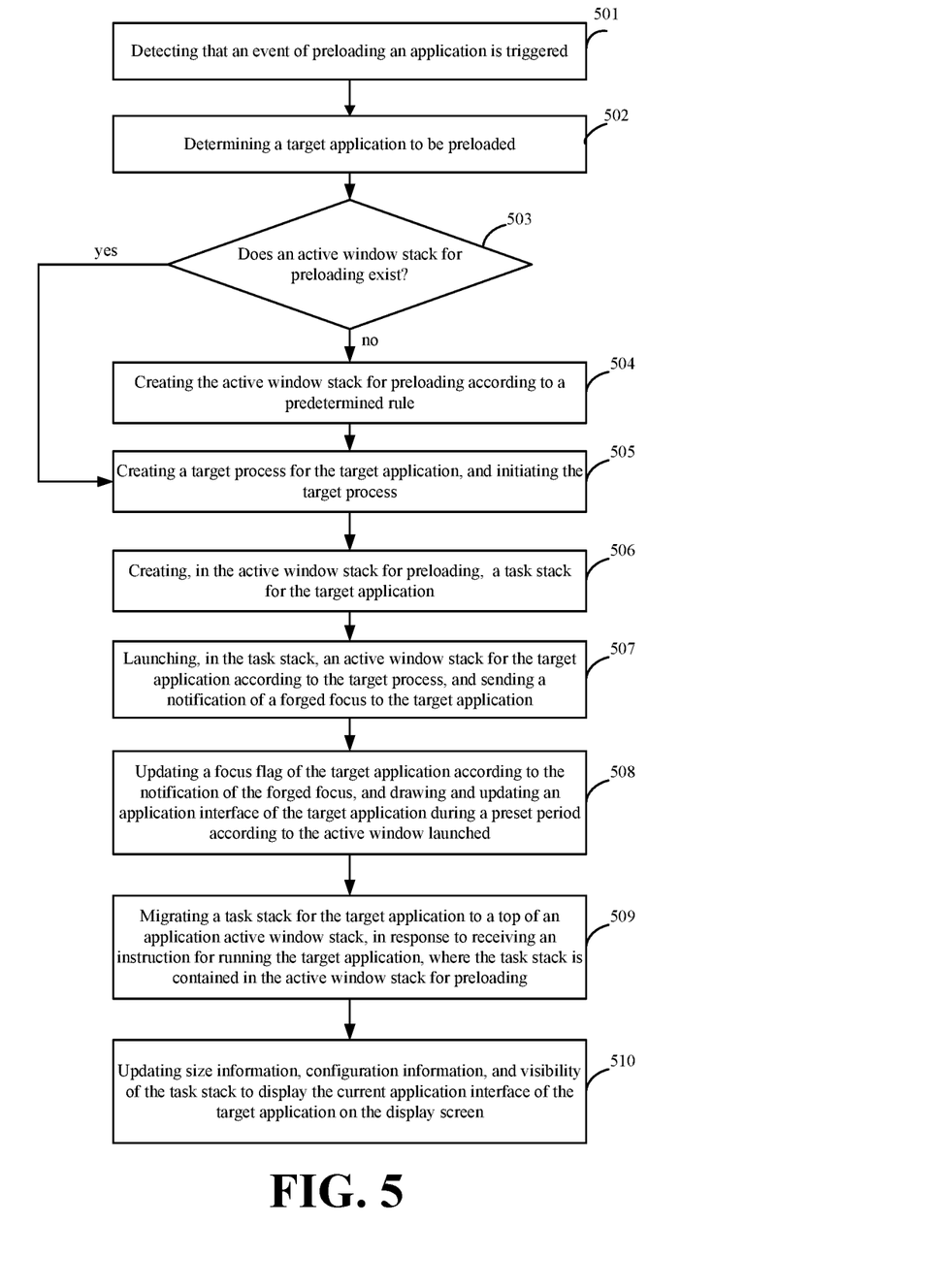
FIG. 5 is a flow chart illustrating another method for preloading an application according to an implementation of the present disclosure.

FIG. 5 is a schematic flow chart illustrating another method for preloading an application according to an implementation of the present disclosure. The method begins at block 501.

At block 501, an event of preloading an application is detected to be triggered.

At block 502, a target application to be preloaded is determined.

At block 503, whether an active window stack for preloading exists is determined. If the active window stack for preloading exists, proceed to an operation at block 504; and if the active window stack for preloading is absent, proceed to an operation at block 505.

At block 504, the active window stack for preloading is created according to a predetermined rule, and an operation at block 505 is performed.

At block 505, a target process for the target application is created, and the target process is initiated.

At block 506, a task stack for the target application is created in the active window stack for preloading.

At block 507, an active window for the target application is launched in the task stack according to the target process, and a notification of a forged focus is sent to the target application.

At block 508, a focus flag of the target application is updated according to the notification of the forged focus, and according to the active window launched, an application interface of the target application is drawn and updated during a preset period.

At block 509, in response to receiving an instruction for running the target application, a task stack for the target application is migrated to a top of an application active window stack, where the task stack is contained in the active window stack for preloading.

In an implementation, taking the application active window as App Stack for an example, the task is moved to the App Stack as follows. The task is deleted from a list of an original stack (that is, the active window stack for preloading), and added to a top of a new stack (App Stack). Each stack has a list for recording all tasks contained in the stack; correspondingly, each task records information of the stack containing the task. Because the stack may contain attributes different from those of other stacks, such as size, configuration, visibility, and zorder, the attributes of the task such as the zorder can be changed by simply adding the task to the list of the new stack. The task is added to the top of the new stack to make the task visible.

At block 510, size information, configuration information, and visibility of the task stack are updated to display the current application interface of the target application on the display screen.

It can be understood that during preloading, the application interface of the target application is continuously drawn and updated. Time at which the target application is actually launched is uncertain. The instruction for running the target application may be received during preloading, and then an application interface currently displayed in the display area defined by the active window stack for preloading may be migrated to the display screen for display. After preloading, when the target application is opened in response to user operation, the application interface preloaded at the end of the preloading may be migrated to the display screen for display.

In an implementation, the size information and the configuration information of the task stack are updated for changing boundaries of the application. The size information and the configuration information may be updated actively. The size information and configuration information of the task may not be changed immediately by simply using the migration operation mentioned. A method for modifying the size information and the configuration information of the task may be actively invoked to ensure the application to be in a correct state and can operate in the foreground normally.

In an implementation, since the target application may still be invisible after the size information and the configuration information are updated, the visibility of the task needs to be updated. A method for updating the visibility of the task is invoked to search for a visible application from top to bottom, set the visible application to be visible, and update a window surface corresponding to the application to be visible. An application may be determined to be visible when the application is not covered by other applications in the zorder, when the application is not covered by a screen-locked interface, or when a top activity of the application is not being initialized or not being exited.

According to the method for preloading an application provided in the implementation of the present disclosure, according to the active window stack for preloading outside of the display screen, the application interface of the application that needs to be preloaded can be drawn and displayed, so that preparations prior to launching of the application can be completed to a large extent, without affecting display of display content of a foreground application on the display screen. When the target application is actually launched, the application interface preloaded is directly migrated to the display screen for display, thereby increasing the speed of launching the target application.

Figure 6:
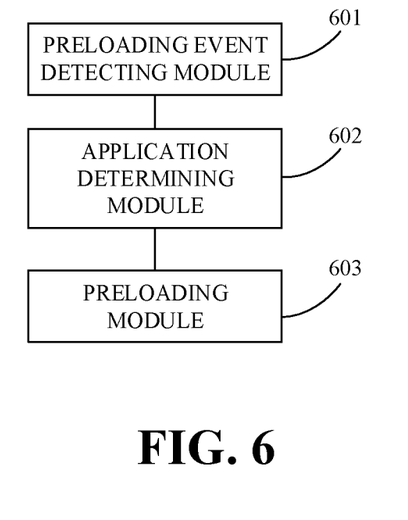
FIG. 6 is a block diagram illustrating a device for preloading an application according to an implementation of the present disclosure.

FIG. 6 is a block diagram illustrating a device for preloading an application according to an implementation of the present disclosure. The device can be implemented with software and/or hardware, and generally, the terminal can be integrated in a terminal. The device can preload an application by executing the method for preloading an application. As illustrated in FIG. 6, the device includes a preloading event detecting module 601, an application determining module 602, and a preloading module 603.

The preloading event detecting unit 601 is configured to detect whether an event of preloading an application is triggered.

The application determining unit 602 is configured to determine a target application to be preloaded in response to detecting that the event of preloading an application is triggered.

The preloading unit 603 is configured to create an active window stack for preloading according to a predetermined rule, and to preload an application interface of the target application according to the active window stack for preloading, where the active window stack for preloading has boundary coordinates locating outside a coordinate range of a display screen.

According to the device for preloading an application provided in the implementation of the present disclosure, after detecting that the event of preloading an application is triggered, the target application to be preloaded is determined, and the application interface of the target application is preloaded according to the active window stack for preloading, where the boundary coordinates of the active window stack for preloading locate outside the coordinate range of the display screen. By using the technical scheme described above, an application interface of an application that needs to be preloaded can be preloaded according to the active window stack for preloading, where the active window stack for preloading locates outside the display screen. According to the method for preloading, preparations prior to launching of the application can be completed to a large extent and a speed of launching the target application can be increased, without affecting display of display content of a foreground application on the display screen.

In an implementation, the preloading module 603 configured to preload the application interface of the target application according to the window active window stack for preloading is configured to determine whether the window active window stack for preloading exists, to create the active window stack for preloading according to the predetermined rule based on a determination that the window active window stack for preloading is absent, and to preload the application interface of the target application according to the active window stack for preloading.

In an implementation, the preloading unit 603 configured to preload the application interface of the target application according to the active window stack for preloading is configured to create a target process for the target application, to create a task stack for the target application in the active window stack for preloading, to launch an active window for the target application in the task stack according to the target process, and to draw and display the application interface of the target application according to the active window launched.

In an implementation, the device further includes a forged focus module.

The forged focus module is configured to send a notification of a forged focus to the target application, and to draw and update the application interface of the target application during a preset period according to the notification of the forged focus.

In an implementation, duration of the preset period includes play duration of a launched advertisement or a launched animation of the target application.

In an implementation, the device further includes an interface migrating module.

The interface migrating module is configured to migrate, in response to receiving an instruction for running the target application after preloading the application interface of the target application according to the active window stack for preloading, the application interface of the target application to the display screen for display, where the application interface is contained in the active window stack for preloading.

In an implementation, the interface migrating module configured to migrate the application interface of the target application to the display screen for display is configured to migrate a task stack for the target application to a top of an application active window stack, where the task stack is contained in the active window stack for preloading, and to update size information, configuration information, and visibility of the task stack to display the application interface of the target application on the display screen.

In an implementation, the boundary coordinates of the active window stack for preloading are denoted as (H, 0, 2H, H), where the boundary coordinates correspond to a system coordinate system, the system coordinate system has an origin locating at an upper left corner of the display screen, and H denotes a length of a long side of a display area of the display screen.

A computer readable storage medium configured to computer executable instructions is further provided in an implementation of the present disclosure. The computer executable instructions are operable with a computer processor to execute a method for preloading an application. The method includes the following.

An event of preloading an application is detected to be triggered. A target application to be preloaded is determined. An active window stack for preloading is created according to a predetermined rule, and an application interface of the target application is preloaded according to the active window stack for preloading, where the active window stack for preloading has boundary coordinates locating outside a coordinate range of a display screen.

The storage medium refers to any of various types of memory devices or storage devices. The term "storage medium" is intended to include: a mounting medium such as a compact disc read-only memory (CD-ROM), a floppy disk, or a tape device; computer system memory or random access memory such as a dynamic random access memory (DRAM), a display data random access memory (DDR-RAM), a static random access memory (SRAM), an extended data output random access memory (EDORAM) and a Rambus random access memory (Rambus RAM); non-transitory memory such as a flash memory and a magnetic medium (such as a hard disk or an optical memory); a register and other similar types of memory element, and the like. The storage medium may also include other types of memory or a combination thereof. In addition, the storage medium may be located in a first computer system in which a program is executed, or may be located in a second computer system coupled to the first computer system via a network, such as the Internet. The second computer system can provide program instructions to the first computer for execution. The term "storage medium" can include two or more storage media that can reside in different locations (e.g. different computer systems connected through a network). The storage medium may store program instructions (e.g. computer programs) executable by one or more processors.

In the implementation of the present disclosure, the computer executable instructions stored in the storage medium are not limited to executing the operations of application preloading as described above, and can also execute relevant operations of the method for preloading an application according to the implementations of the present disclosure.

Figure 7:
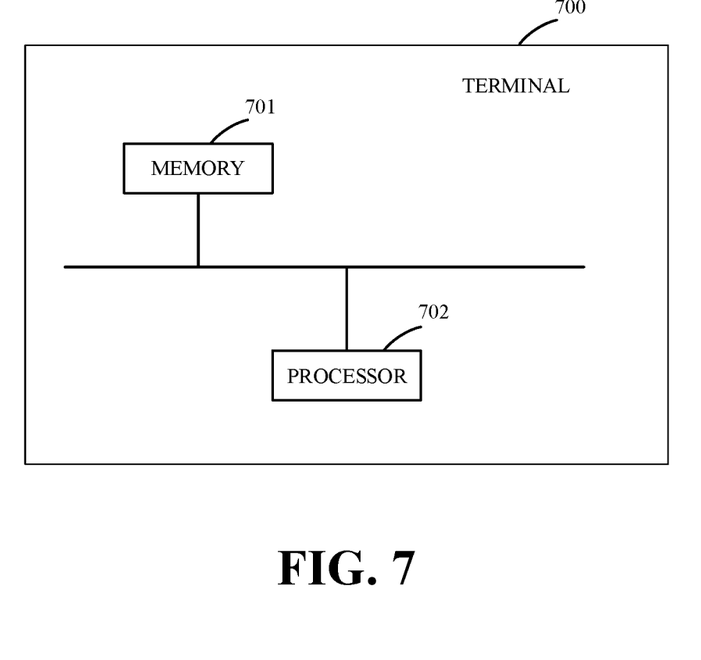
FIG. 7 is a block diagram illustrating a terminal according to an implementation of the present disclosure.

A terminal is provided in an implementation of the present disclosure. The device for preloading an application provided in the implementation of the present disclosure can be integrated into the terminal. FIG. 7 is a schematic structural diagram illustrating the terminal according to an implementation of the present disclosure. The terminal 700 may include a memory 701, a processor 702, and computer programs stored in the memory 701 and executed by the processor 702. The processor 702 is configured to execute the computer programs to implement the method for preloading an application provided in the implementations of the present disclosure.

According to the terminal provided in the implementation of the present disclosure, an application interface of an application that needs to be preloaded can be preloaded according to an active window stack for preloading, where the active window stack for preloading locates outside the display screen. In this way, preparations prior to launching of the application can be completed to a large extent and a speed of launching the target application can be increased, without affecting display of display content a foreground application on the display screen.

Figure 8:
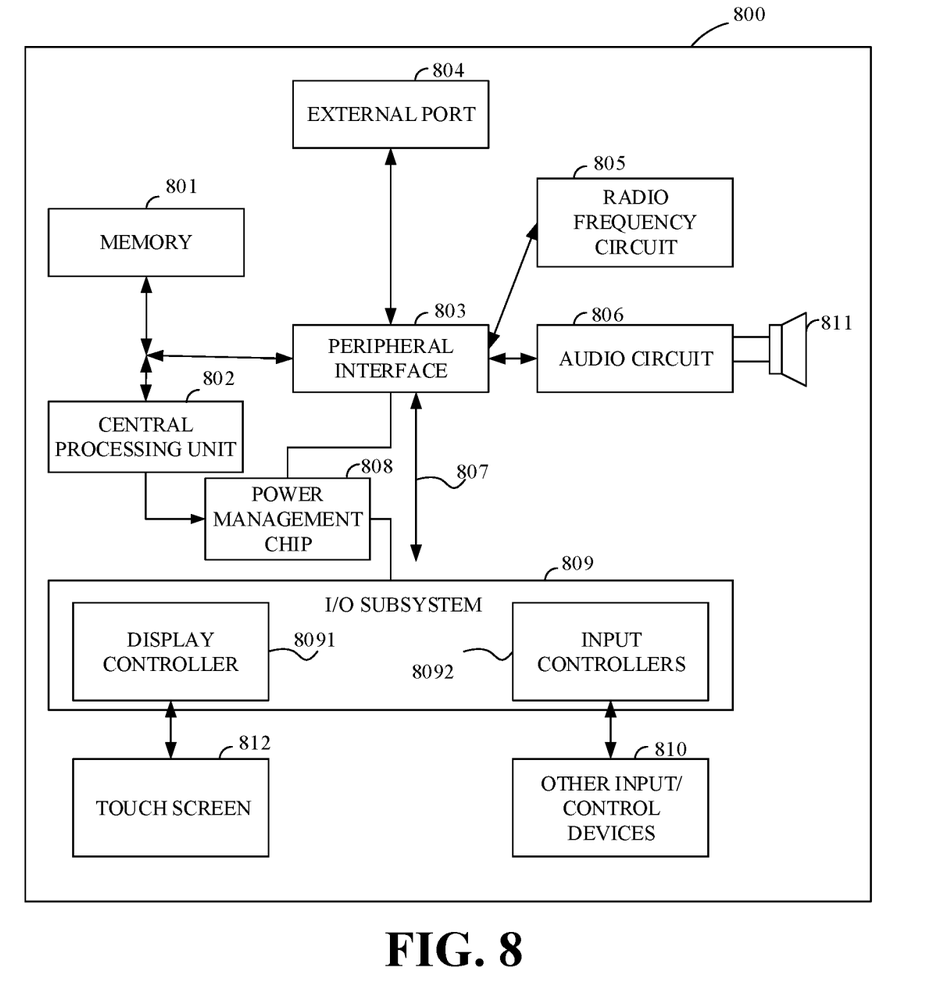
FIG. 8 is a block diagram illustrating another terminal according to an implementation of the present disclosure.

FIG. 8 is a schematic structural diagram illustrating another terminal according to an implementation of the present disclosure. The terminal includes a housing (not illustrated), a memory 801, a central processing unit (CPU) 802 (also referred to as a processor, hereinafter CPU for short), a circuit board (not illustrated), and a power supply circuit (not illustrated). The circuit board is disposed inside a space defined by the housing. The CPU 802 and the memory 801 are disposed on the circuit board. The power supply circuit is configured to supply power to each circuit or component of the terminal. The memory 801 is configured to store executable program codes. The CPU 802 is configured to run a computer program corresponding to the executable program codes by reading the executable program codes stored in the memory 801 to carry out the following operations.

An event of preloading an application is detected to be triggered. A target application to be preloaded is determined. An active window stack for preloading is created according to a predetermined rule, and an application interface of the target application is preloaded according to the active window stack for preloading, where the active window stack for preloading has boundary coordinates locating outside a coordinate range of a display screen.

The terminal further includes a peripheral interface 803, an radio frequency (RF) circuit 805, an audio circuit 806, a speaker 811, a power management chip 808, an input/output (I/O) subsystem 809, other input/control devices 810, a touch screen 812, other input/control devices 810, and an external port 804, which are communicated via one or more communication buses or signal lines 807.

It should be understood that, the terminal 800 illustrated is exemplary and the terminal 800 may have more or fewer components than those illustrated in FIG. 8. For example, two or more components may be combined, or different component configurations can be adopted in the terminal. The various components illustrated in FIG. 8 can be implemented in hardware, software, or a combination of hardware and software including one or more signal processing and/or application specific integrated circuits.

The following describes a mobile phone as an example of the terminal for preloading an application.

The memory 801 is accessible by the CPU 802, the peripheral interface 803, and so on. The memory 801 may include a high-speed random access memory and may further include a non-transitory memory such as one or more magnetic disk storage devices, flash memory devices, or other transitory solid-state memory devices.

The peripheral interface 803 is configured to connect the input and output peripherals of the device to the CPU 802 and the memory 801.

The I/O subsystem 809 is configured to connect the input and the output peripherals such as the touch screen 812 and other input/control devices 810 to the peripheral interface 803. The I/O subsystem 809 may include a display controller 8091 and one or more input controllers 8092 configured to control other input/control devices 810. The one or more input controllers 8092 are configured to receive electrical signals from or send electrical signals to other input/control devices 810, where other input/control devices 810 may include a physical button (a press button, a rocker button, etc.), a dial, a slide switch, a joystick, or a click wheel. It should be noted that the input controller 8092 can be coupled with any of a keyboard, an infrared port, a universal serial bus (USB) interface, and a pointing apparatus such as a mouse.

The touch screen 812 functions as an input interface and an output interface between a terminal and a user, and is configured to display a visual output to the user. The visual output may include graphics, text, icons, videos, and the like.

The display controller 8091 in the I/O subsystem 809 is configured to receive an electrical signal from or send an electrical signal to the touch screen 812. The touch screen 812 is configured to detect contact or touch on the touch screen. The display controller 8091 is configured to convert the contact detected into an interaction with a user interface object displayed on the touch screen 812, that is, to realize human-computer interaction. The user interface object displayed on the touch screen 812 may be an icon of a running game, an icon indicating connection to corresponding networks, and the like. It should be noted that, the device may also include a light mouse, which is a touch sensitive surface that does not display a visual output, or can be an extension of a touch sensitive surface formed by the touch screen.

The RF circuit 805 is configured to establish communication between a mobile phone and the wireless network (i.e. network side) and to transmit and receive data between the mobile phone and the wireless network, for example, transmit and receive short messages, emails, and the like. The RF circuit 805 is configured to receive and transmit RF signals (also known as electromagnetic signals), to convert an electrical signal into an electromagnetic signal or convert an electromagnetic signal into an electrical signal, and to communicate with a communication network and other devices through electromagnetic signals. The RF circuit may include known circuits for performing these functions, including but not limited to an antenna system, an RF transceiver, one or more amplifiers, a tuner, one or more oscillators, a digital signal processor, a coder-decoder (CODEC) chipset, a subscriber identity module (SIM), and so on.

The audio circuit 806 is configured to receive audio data from the peripheral interface 803, to convert the audio data into an electric signal, and to transmit the electric signal to the speaker 811.

The speaker 811 is configured to restore the voice signal received by the mobile phone from the wireless network via the RF circuit 805 to sound and to play the sound to the user.

The power management chip 808 is configured for power supply and power management of the hardware connected to the CPU 802, the I/O subsystem 809, and the peripheral interfaces 803.

The device for preloading an application, the storage medium, and the terminal provided in the above implementations have corresponding functional modules and can execute the corresponding method for preloading an application, and thus each contributes to advantageous effects of executing the method. For technical details not described herein, reference may be made to the description of the method for preloading an application.

It should be noted that the above are only some implementations of the present disclosure and the technical principles applied thereto. Those skilled in the art will appreciate that the present disclosure is not limited to the implementations described herein, and that various changes, modifications, and substitutions can be made by those skilled in the art without departing from the scope of the disclosure. While the present disclosure has been described in connection with certain implementations, it is to be understood that the disclosure is not to be limited to the disclosed implementations but, on the contrary, is intended to cover various modifications and equivalent arrangements included within the scope of the disclosure. The scope of the disclosure is determined by the scope of the appended claims.

What is claimed is:

1. A method for preloading an application, comprising:
   determining a target application to be preloaded in response to triggering an event of preloading an application;
   creating an active window stack for preloading according to a predetermined rule, the active window stack for preloading having boundary coordinates locating outside a coordinate range of a display screen; and
   preloading an application interface of the target application according to the active window stack for preloading, wherein preloading the application interface of the target application comprises:
   creating a target process for the target application;
   creating, in the active window stack for preloading, a task stack for the target application;
   launching, in the task stack, an active window for the target application according to the target process; and
   drawing and displaying the application interface of the target application according to the active window launched.

2. The method of claim 1, further comprising:
   enabling the target application to have a focus independent of a focus of an application in the foreground; and
   drawing and updating the application interface of the target application during a preset period according to the focus of the target application.

3. The method of claim 2, wherein duration of the preset period comprises play duration of preset content of the target application, and during play of the preset content of the target application, the target application is unable to respond to user input.

4. The method of claim 1, further comprising:
   migrating, in response to receiving an instruction for running the target application, the application interface of the target application to the display screen for display.

5. The method of claim 4, wherein migrating the application interface of the target application to the display screen for display comprises:
   migrating a task stack for the target application to a top of an application active window stack, the task stack being contained in the active window stack for preloading, and the application active window stack having boundary coordinates locating within the coordinate range of the display screen; and
   updating size information, configuration information, and visibility of the task stack to display the application interface of the target application on the display screen.

6. The method of claim 1, wherein the boundary coordinates of the active window stack for preloading are denoted as (H, 0, 2H, H), the boundary coordinates correspond to a system coordinate system, the system coordinate system has an origin locating at an upper left corner of the display screen, and H denotes a length of a long side of a display area of the display screen.

7. A terminal, comprising:
   at least one processor; and
   a computer readable memory, coupled to the at least one processor and storing at least one computer executable instruction therein, which when executed by the at least one processor, cause the at least one processor to carry out actions, comprising:
   determining a target application to be preloaded in response to triggering an event of preloading an application;
   creating an active window stack for preloading according to a predetermined rule, the active window stack for preloading having boundary coordinates locating outside a coordinate range of a display screen; and
   preloading an application interface of the target application according to the active window stack for preloading;
   wherein the at least one processor carrying out the action of preloading the application interface of the target application is configured to carry out actions, comprising:
   creating a target process for the target application;
   creating, in the active window stack for preloading, a task stack for the target application;
   launching, in the task stack, an active window for the target application according to the target process; and
   drawing and displaying the application interface of the target application according to the active window launched.

8. The terminal of claim 7, wherein the at least one processor is further caused to carry out actions, comprising:
   enabling the target application to have a focus independent of a focus of an application in the foreground; and
   drawing and updating the application interface of the target application during a preset period according to the focus of the target application.

9. The terminal of claim 8, wherein duration of the preset period comprises play duration of preset content of the target application, and during play of the preset content of the target application, the target application is unable to respond to user input.

10. The terminal of claim 7, wherein the at least one processor is further caused to carry out actions, comprising:
    migrating, in response to receiving an instruction for running the target application, the application interface of the target application to the display screen for display.

11. The terminal of claim 10, wherein the at least one processor carrying out the action of migrating the application interface of the target application to the display screen for display is configured to carry out actions, comprising:
    migrating a task stack for the target application to a top of an application active window stack, the task stack being contained in the active window stack for preloading, and the application active window stack having boundary coordinates locating within the coordinate range of the display screen; and
    updating size information, configuration information, and visibility of the task stack to display the application interface of the target application on the display screen.

12. The terminal of claim 7, wherein the boundary coordinates of the active window stack for preloading are denoted as (H, 0, 2H, H), the boundary coordinates correspond to a system coordinate system, the system coordinate system has an origin locating at an upper left corner of the display screen, and H denotes a length of a long side of a display area of the display screen.

13. A non-transitory computer-readable storage medium storing at least one computer-executable instruction which, when executed by at least one processor, causes the at least one processor to carry out actions, comprising:
    determining a target application to be preloaded in response to triggering an event of preloading an application;
    creating an active window stack for preloading according to a predetermined rule, the active window stack for preloading having boundary coordinates locating outside a coordinate range of a display screen; and
preloading an application interface of the target application according to the active window stack for preloading;
wherein the at least one computer-executable instruction is further executed by the at least one processor to carry out actions, comprising:
migrating, in response to receiving an instruction for running the target application, the application interface of the target application to the display screen for display;
wherein the at least one computer-executable instruction executed by the processor to carry out the action of migrating the application interface of the target application to the display screen for display is executed by the at least one processor to carry out actions, comprising:
migrating a task stack for the target application to a top of an application active window stack, the task stack being contained in the active window stack for preloading, and the application active window stack having boundary coordinates locating within the coordinate range of the display screen; and
updating size information, configuration information, and visibility of the task stack to display the application interface of the target application on the display screen.

14. The non-transitory computer-readable storage medium of claim 13, wherein the at least one computer-executable instruction executed by the processor to carry out the action of preloading the application interface of the target application is configured to carry out actions, comprising:
creating a target process for the target application;
creating, in the active window stack for preloading, a task stack for the target application;
launching, in the task stack, an active window for the target application according to the target process; and
drawing and displaying the application interface of the target application according to the active window launched.

15. The non-transitory computer-readable storage medium of claim 14, wherein the at least one computer-executable instruction is further executed by the at least one processor to carry out actions, comprising:
enabling the target application to have a focus independent of a focus of an application in the foreground; and
drawing and updating the application interface of the target application during a preset period according to the focus of the target application.

16. The non-transitory computer-readable storage medium of claim 13, wherein the boundary coordinates of the active window stack for preloading are denoted as (H, 0, 2H, H), the boundary coordinates correspond to a system coordinate system, the system coordinate system has an origin locating at an upper left corner of the display screen, and H denotes a length of a long side of a display area of the display screen.

* * * * *